(12) United States Patent
Watanabe et al.

(10) Patent No.: US 6,809,264 B2
(45) Date of Patent: Oct. 26, 2004

(54) FEEDER ASSEMBLY OF CAR SLIDING DOOR

(75) Inventors: Hiroshi Watanabe, Shizuoka (JP); Ryoichi Fukumoto, Aichi (JP)

(73) Assignee: Yazaki Corporation, Tokyo (JP)

( * ) Notice: Subject to any disclaimer, the term of this patent is extended or adjusted under 35 U.S.C. 154(b) by 86 days.

(21) Appl. No.: 10/212,147

(22) Filed: Aug. 6, 2002

(65) Prior Publication Data

US 2003/0037958 A1 Feb. 27, 2003

(30) Foreign Application Priority Data

Aug. 7, 2001 (JP) ...................................... 2001-238703

(51) Int. Cl.[7] ................................................ H01B 7/06
(52) U.S. Cl. ...................... 174/72 A; 174/68.3; 174/48; 174/135
(58) Field of Search ................................ 174/72 A, 48, 174/68.3, 69, 99 E, 135, 72 C; 361/826; 439/162

(56) References Cited

U.S. PATENT DOCUMENTS

| | | | |
|---|---|---|---|
| 6,076,883 A | 6/2000 | Labonde et al. | ............ 296/155 |
| 6,108,976 A | 8/2000 | Kato et al. | ..................... 49/360 |
| 6,290,283 B1 | 9/2001 | Fukumoto et al. | ........... 296/155 |
| 6,515,229 B2 * | 2/2003 | Aoki et al. | ............... 174/72 A |
| 6,566,603 B2 * | 5/2003 | Doshita et al. | ........... 174/72 A |
| 6,593,529 B2 * | 7/2003 | Nakata et al. | ............ 174/65 G |

FOREIGN PATENT DOCUMENTS

| | | |
|---|---|---|
| JP | 2002-17031 | 1/2002 |
| JP | 2002-84643 | 3/2002 |

OTHER PUBLICATIONS

British Search Report dated Jan. 30, 2003.

* cited by examiner

Primary Examiner—Dhiru R Patel
(74) Attorney, Agent, or Firm—Armstrong, Kratz, Quintos, Hanson & Brooks, LLP

(57) ABSTRACT

A feeder assembly of a car sliding door has a protector in which a wiring harness is arranged for electrically connecting a car sliding door side with a car body side. The assembly includes a generally circumferential wall positioned inside the protector and an auxiliary unit disposed within the wall, the auxiliary unit connected to the wiring harness. A resilient member resiliently urges the wiring harness within the protector, and the circumferential wall also serves as a stopper to limit the bending of the resilient member. An outside harness insertion hole and an inside harness insertion hole are formed in the wall, the outside harness insertion hole leading the wiring harness outside the protector, the inside harness insertion hole leading the wiring harness inside the protector. The circumferential wall has a bottom deeper than a base pate of the protector. The inside harness insertion hole is disposed between the bottom of the circumferential wall and the base pate of the protector. The auxiliary unit is secured by a fixing means and a locking means.

6 Claims, 3 Drawing Sheets

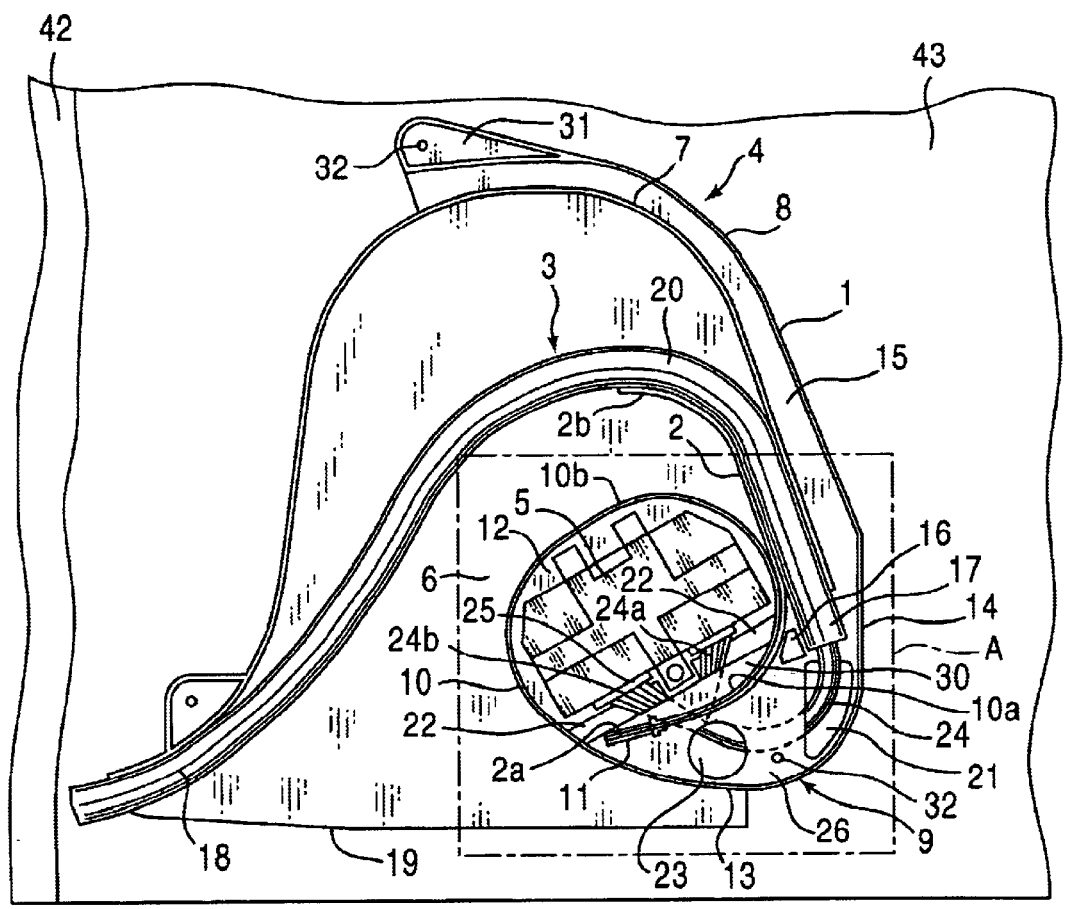
F I G. 1
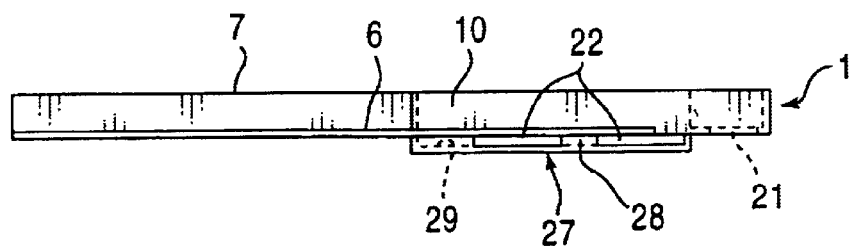
F I G. 4

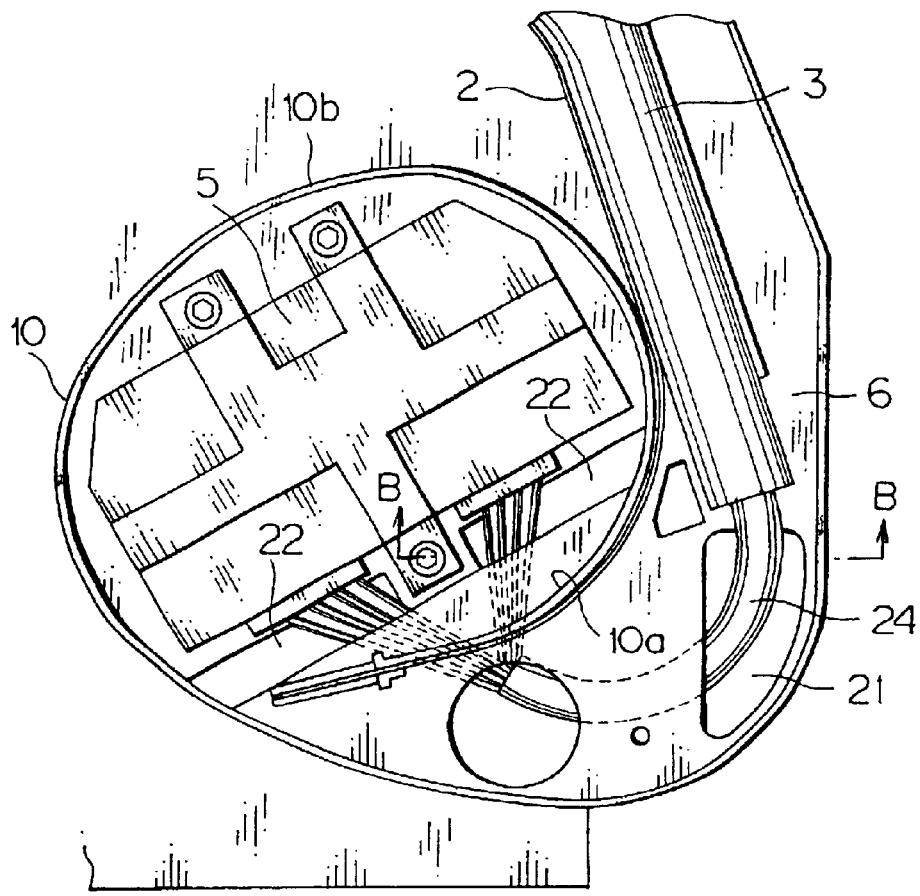
F I G. 2
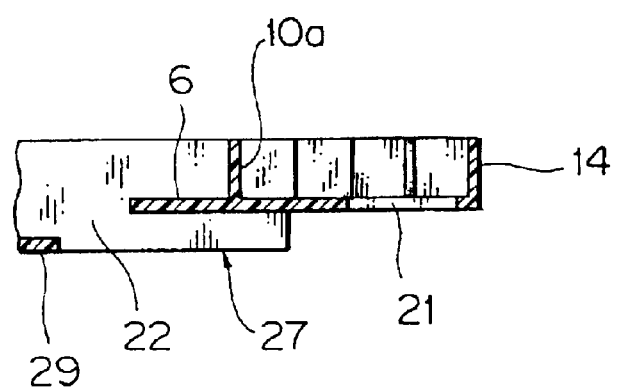
F I G. 5

FEEDER ASSEMBLY OF CAR SLIDING DOOR

BACKGROUND OF THE INVENTION

1. Field of the Invention

The present invention relates to a feeder assembly of a car sliding door, which is provided with a protector for a wiring harness disposed in the car sliding door particularly to supply an electrical power from a car body side to a slide door side via the wiring harness. A resilient member is provided within the protector to prevent an undesirable slack of the wiring harness.

2. Related Art

One-box type or ban type cars have been conventionally furnished with a sliding door. Such a slide door is provided with a plurality of auxiliary units including electrical equipment and a switch unit. Various types of feeder assemblies and structures have been proposed to electrically connect the auxiliary units to a battery disposed in a side of a car body.

Since a wiring harness is employed to electrically connect the car body side to the sliding door side, a slack of the wiring harness which is caused by the opening movement of the sliding door must be appropriately handled. For example, a spring is provided to resiliently support the wiring harness within the sliding door to limit the slack of the wiring harness.

Furthermore, to prevent an interruption of the wiring harness with other parts such as the auxiliary units during the opening and closing movements of the sliding door within the sliding door, the wiring harness is covered by a flexible tube made of a resin material, or a harness protection space is provided in the sliding door to receive a bent portion of the wiring harness.

However, a desirable free arrangement of the auxiliary units within the sliding door may be limited due to the provision of the harness protection space. When a resilient member is provided within the harness protection space to resiliently support the wiring harness to limit the slack of the wiring harness, the resilient member may interfere with the wiring harness, casing a damage of the wiring harness. A longer or complicated route of the wiring harness is required for eliminating the interruption of the resilient member with the wiring harness. This disadvantageously needs a larger protection structure for the wiring harness as well as a larger arrangement space for the wiring harness in the sliding door side.

SUMMARY OF THE INVENTION

In view of the aforementioned disadvantages, an object of the invention is to provide a feeder assembly of a car sliding door which allows a desirable free arrangement of auxiliary units even when a harness protecting member is employed in the car sliding door. Furthermore, when a resilient member is provided within a harness protection space to resiliently support the wiring harness to limit the slack of the wiring harness, the feeder assembly of the sliding door does not cause the resilient member to interfere with the wiring harness. The wiring harness can be easily arranged in the sliding door without an undesirably longer route thereof. Thus, the feeder assembly does not require a larger protection structure for the wiring harness to achieve a reduced space for arranging the feeder assembly within the sliding door.

For achieving the object, a feeder assembly of a car sliding door according to the present invention has a protector in which a wiring harness is arranged for electrically connecting a sliding door side with a car body side. The assembly comprises a generally circumferential wall positioned inside the protector and an auxiliary unit disposed within the circumferential wall, the auxiliary unit connected to the wiring harness.

This configuration makes use of a space inside the protector, allowing a free arrangement of the auxiliary unit in a side of the sliding door. The provision of the protector does not decrease an arrangement space of the auxiliary unit in the side of the sliding door. Furthermore, the circumferential wall prevents the auxiliary unit from interfering with the wiring harness, causing no damage of the wiring harness and the auxiliary unit due to the interference.

Preferably, the assembly further comprises a resilient member resiliently urging the wiring harness within the protector in a direction to prevent slack of the wiring harness, and the circumferential wall also serves as a stopper to limit bending of the resilient member.

Thereby, when an opening movement of the sliding door causes the resilient member to be bent further so that the resilient member abuts against the circumferential wall. The abutment prevents an excessive bent of the resilient member, causing no damage of the resilient member and the wiring harness due to the excessive bent thereof. The auxiliary unit is protected within the circumferential wall not to interfere with the resilient member and the wiring harness.

Preferably, the assembly further comprises an inside harness insertion hole and an outside harness insertion hole which are formed in the circumferential wall, the outside harness insertion hole leading the wiring harness outside the protector, the inside harness insertion hole leading the wiring harness inside the protector.

Thereby, the wiring harness is led outward through the outside harness insertion hole so that the wiring harness does not interfere with the circumferential wall. In the mean time, the wiring harness is led inward through the inside harness insertion hole so that the wiring harness can be connected to the auxiliary unit disposed in the circumferential wall via a shorter route. This minimizes and simplifies the structure of the protector to require a smaller accommodation space in the sliding door side.

Preferably, the circumferential wall has a bottom deeper than a base plate of the protector. Thereby, an enlarged space for receiving the auxiliary unit is provided, allowing an easy, sure arrangement of a larger auxiliary unit which will be more freely designed.

Preferably, the inside harness insertion hole of the circumferential wall is disposed between the bottom of the wall and the base pate of the protector.

Thereby, the wiring harness is inwardly led along the base plate and is inserted almost straight into the inside harness insertion hole, i.e. without a bent. This enables an easy insertion work of the wiring harness and eliminates an aging damage of the wiring harness due to a bending deformation of the wiring harness.

Preferably, the auxiliary unit is secured by a fixing means and/or a locking means.

Thereby, the auxiliary unit is easily locked by the locking means and is secured by the fixing means within the protector. The auxiliary unit may be preliminarily positioned by the locking means and may be finally secured by the fixing means. This enables a sure, easy securing work thereof.

BRIEF DESCRIPTION OF THE DRAWINGS

FIG. 1 is a front view showing an embodiment of a feeder assembly of a car sliding door;

FIG. 2 is an enlarged view of a portion A of FIG. 1;

FIG. 4 is a plan view of a protector body, which shows a lower surface thereof;

FIG. 5 is a sectional view taken along line B—B of FIG. 2 for showing the protector body.

DETAILED DESCRIPTION OF THE PREFERRED EMBODIMENTS

Figure 3:
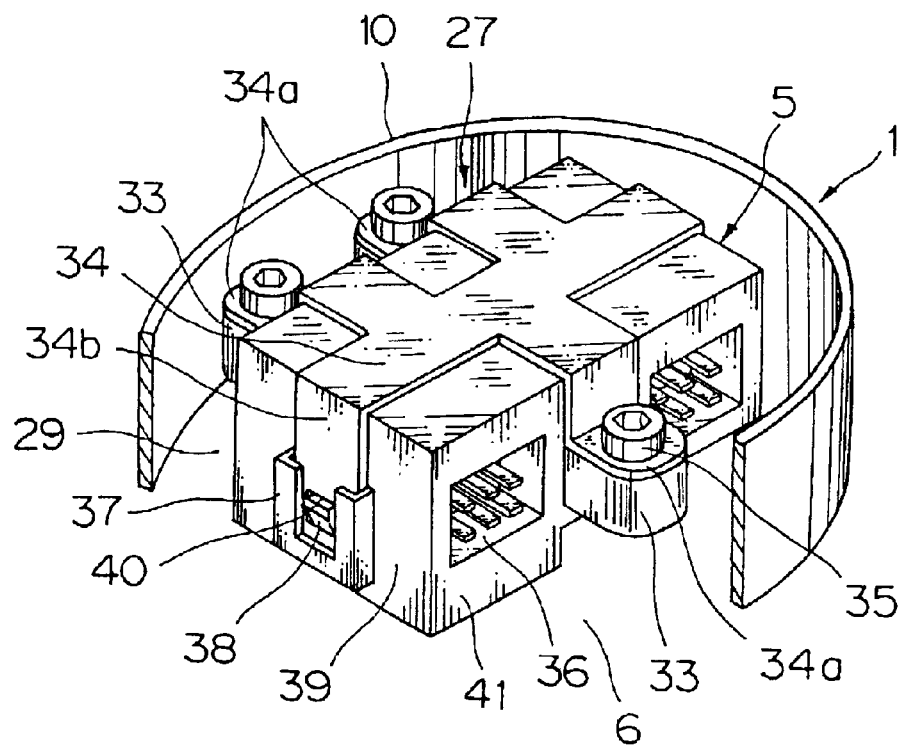
FIG. 3 is a perspective view showing a fitting state of an auxiliary unit in the feeder assembly.

Referring to the accompanied drawings, an embodiment of the present invention will be discussed in detail.

FIGS. 1 to 6 show an embodiment of a feeder assembly of a car sliding door for, which employs a harness protector according to the present invention In FIG. 1, reference numeral 1 designates a protector main body made of a synthetic resin material; 2 a resilient member which is a plate spring attached within the protector main body; and 3 a wiring harness. The wiring harness 3 is resiliently urged by the resilient member 2 upward and can be flexible within the protector main body 1.

A sliding door feeder unit (assembly) 4 is characterized in that an auxiliary unit 5 such as electrical equipment disposed in a side of a car sliding door is mounted within the protector main body 1 and the wiring harness 3 is arranged three-dimensionally within the protector main body 1 in conformity with the resilient member 2.

The auxiliary unit 5 includes, for example, a power slide unit for opening and closing a sliding door 43, a power window motor, a door lock unit, various types of switches and sensors, and an electronics unit.

The protector main body 1 has abase plate 6 of a substantially semicircular or trapezoidal shape, inner or outer peripheral walls 7 and 8 raised from the base plate 6, and a wall 9 generally spirally curbed inside the protector main body 1.

The spiral wall 9 has an inner, elongated circle shaped (generally circumferential) wall 10. The circumferential wall 10 has a lower part 10a which serves as a securing portion 11 for the resilient member 2. The lower part 10a guides the resilient member 2 and limits the deformation of the resilient member 2 (deformation limiting wall). The circumferential wall 10 has an upper part 10b which also limits the deformation of the resilient member 2 (deformation limiting wall). The auxiliary unit 5 is arranged in an inner space 12 of the circumferential wall 10. In this embodiment, the auxiliary unit 5 is substantially rectangular and is positioned generally along the elongated circle wall 10 in a diagonally upward direction.

The upper portion 10b of the elongated circle wall 10 is contiguous with a gently curved wall 13 lower than the lower portion 10a. The curved wall 13 is contiguous with a vertical straight portion 14 at a fore end side of the protector main body 1. The straight portion 14 is upwardly contiguous with the outer curved peripheral wall 8. Between the outer peripheral wall 8 and the inner peripheral wall 7, there is provided a harness passage 15 to lead a part (not shown) of the wiring harness 3. Through the harness passage 15, the wiring harness 3 is connected to various auxiliary units such as electrical equipment and a switch unit which are disposed in the sliding door side. Note that the longitudinal direction of the protector main body 1 is parallel to that of the car.

Between the peripheral wall 7 and the elongated circle 10, there is arranged the wiring harness 3. Preferably, the wiring harness 3 has one end 17 secured by a fixing means (not shown) within the protector main body 1. For example, a portion 16 engages with a grooved surface of a corrugated tube covering the wiring harness to stop the wiring harness 3 in the longitudinal direction.

The wiring harness 3 has the other end 18 which leads out from a rear end of the protector main body 1 through a wide opening 19 positioned in a lower side of the protector main body 1 as illustrated in FIG. 1 in the closed state of the sliding door. The other end 18 of the wiring harness 3 is connected to another wiring harness (not shown) disposed in a car body side 42 with connectors or the like. During an opening operation of the sliding door, the other end 18 of the wiring harness 3 is pushed rearward (toward the auxiliary unit 5) so that the wiring harness 3 tends to sag within the protector main body 1 to be partially pushed out through the lower opening 19. To prevent the sagging of the wiring harness 3, the resilient member 2 urges the wring harness 3 upward to correct the slack of the wiring harness 3.

The resilient member 2 is positioned along the lower portion 10a of the circumferential wall 10 and is resiliently contacting an inner surface of a curved portion 20 of the wiring harness 3. The resilient member 2 has a base end (lower end) 2a, which is secured to a securing portion 11, and another fixing means (not shown). The resilient member 2 has a leading end (upper end) 2b positioned around the top of the curved portion 20 of the wiring harness 3 to support the wiring harness 3. The leading end 2b may be fitted to the wiring harness 3 by a fixing means (not shown).

When the sliding door is completely opened or is opened with a strong force, the resilient member 2 deflects downward to abut against the upper portion 10b. This prevents breaking of the resilient member 2 and limits a further deformation of the wiring harness 3, preventing slack and damages of the wiring harness 3.

Inside the circumferential wall 10 including the upper portion 10b, the vertical base plate 6 is provided. The base plate 6 is also extended between the lower portion 10a of the circumferential wall 10 and the further lower curved wall 13, in which there are defined first to third harness insertion holes 21 to 23. Through the first harness insertion hole 21, an electrical cable 24 of the wiring harness 3 is led from the inside of the protector main body 1 to the outside (rear side) of the protector main body 1 at one end of the wiring harness 3. Through the second harness insertion hole 22, the electrical cable 24 of the wiring harness 3 is led into the inside of the circumferential wall 10 to be connected to the auxiliary unit 5 positioned within the circumferential wall 10.

The electrical cable 24 and the auxiliary unit 5 are easily connected to each other, e.g. via connectors 25. Alternatively, electrical wires 24a may be directly led out from the auxiliary unit 5 through the second harness insertion hole 22 to the outside of the protector main body 1 and then may be led again into the inside of the protector main body 1 through the first harness insertion hole 21, so that the electrical wires 24a constitute a part of the wiring harness 3 arranged in the protector main body 1.

The first harness insertion hole 21 is positioned around a fore end of the protector main body 1, and the second harness insertion hole 22 is equal in height to the first harness insertion hole 21. The first and second harness insertion holes 21 and 22 are generally aligned in a longitudinal direction of the sliding door. The second harness insertion hole 22 of the embodiment is elongated, one side edge of which faces the circumferential wall 10, and the opposed side edge of which is close to the auxiliary unit 5. For example, a pair of second harness insertion holes 22 are provided, through one of which input electrical wires 24a of the auxiliary unit 5 are led and through the other of which output electrical wires 24b of the auxiliary unit 5 are led.

Between the lower portion 10a of the circumferential wall 10 and the further lower (outside) curved wall 13, there is defined a crescent-shaped, comparatively broad harness receiving space 26. In the middle of the harness receiving space 26, the third harness insertion hole 23 is formed in a circular shape. The electrical cable 24 of the wiring harness 3 may be passed through at least one of the first harness insertion hole 21 and the third harness insertion hole 23. Each of the harness insertion holes 21 to 23 may be formed in a desired shape.

As illustrated in a mounting state of the auxiliary unit 5 of FIG. 3, the auxiliary unit 5 is secured to the protector main body 1 by a thin plate bracket 34. The bracket 34 is made of, e.g. metal and has a plurality of tabs 34a and 34b, the tabs 34a being perpendicular to the tabs 34b. Each tab 34a has a free end formed with a hole (not shown), and the tab 34a is folded to define a step parallel to the auxiliary unit 5 and a pedestal 33 of the protector main body 1, so that a bolt 35 is inserted through the hole to secure the tab 34a to the pedestal 33 by a securing bolt 35. The pedestal 33 has, e.g. an imbedded nut (not shown). The pedestal 33 protrudes from the base plate 6 or a bottom wall 29 (positioned lower than the base plate 6) of an auxiliary unit receiving recess 27. That is, the tab 34a and the pedestal 33 constitute a fixing means for the auxiliary unit 5.

A pair of the tabs 34b of the bracket 34 are folded in a right angle along the auxiliary unit 5, and a free end of each tab 34b is locked to a wall 39 of the auxiliary unit 5 by a locking means. For example, the free end of each tab 34b has a locking hole 40, while, on the wall 39 of the auxiliary unit 5, there are provided a guide frame 37 having a central cutout and a protrusion 38 positioned in the cutout. Inserting the free end of the tab 34b into the frame 37 engages the locking hole 40 with the protrusion 38. That is, the tab 34b, the locking hole 40, the frame 37, and the protrusion 38 constitute the locking means.

The auxiliary unit 5 has a pair of receptacle connectors 36 provided in a longer wall 41 thereof. The connector 36 has a connector mating recess and a plurality of pin or tab terminals disposed in the recess. The connector mating recess may be defined in a connector housing (not shown) protruding from the wall 41. The wall 41 and inner walls of the connector housing are each made of an electrically insulating material. One of the pedestals 33 is positioned between the pair of connectors 36.

Some auxiliary units 5 may be provided with a locking means without a securing means having bolts 35. The locking means is not limited in the configuration illustrated in FIG. 3 but the tab 34b may have a resilient locking hook (not shown) which is engageable with a frame provided on the auxiliary unit 5. Alternatively, the protector main body 1 may have a flexible locking arm (not shown) to hook on an edge of the auxiliary unit 5. Furthermore, the auxiliary unit 5 may have a plug connector which is engageable with a corresponding receptacle connector joined to the electrical cable 24.

As illustrated in FIG. 4 (taken from a lower side), an auxiliary unit receiving recess 27 is defined to be extended in a rear side of the base plate 6 of the protector main body 1, and the auxiliary unit receiving recess 27 has a lower wall 28 formed with the pair of second harness insertion holes 22 aligned with each other. To define the auxiliary unit receiving recess 27, a larger part of the base plate 6 (FIG. 1) penetrates through the base plate 6 to extend rearward therefrom, so that the auxiliary unit receiving recess 27 has a bottom wall 29 having a larger depth than the base plate 6. The larger part accomodates the body of the auxiliary unit 5 except the electrical wires 24a and 24b. That is, the larger part is positioned above the second harness insertion hole 22. This increases an inner space volume 12 inside the circumferential wall 10 (FIG. 1) to be able to receive a larger auxiliary unit 5.

For example, a bottom plate designated by reference 30 in FIG. 1 is positioned at the same height as the base plate 6. As illustrated in FIG. 5 which is a sectional view taken along line B—B of FIG. 2 for showing the protector main body 1, the second harness insertion hole 22 is positioned diagonally between the base plate 6 and the bottom wall 29 of the auxiliary unit receiving recess 27. That is, the first harness insertion hole 21 is positioned vertically, while the second harness insertion hole 22 is opened vertically and horizontally. In FIG. 5, reference numeral 10a designates a lower part of the circumferential wall 10, and reference numeral 14 designates a vertical straight portion of the outer peripheral wall 8 (FIG. 2).

Figure 6:
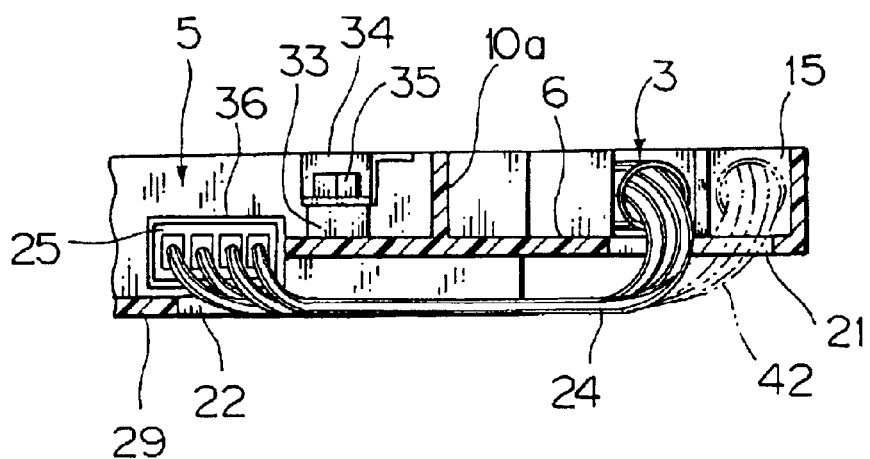
FIG. 6 is a sectional view taken along line B—B of FIG. 2 to show a state where a wiring harness is arranged in the protector body which has been fitted with the auxiliary unit.

As illustrated in FIGS. 2 and 6 which are a sectional view taken along line B—B of FIG. 2, the electrical cable 24 of the wiring harness 3 is arranged along a rear surface of the base plate 6 from the first harness insertion hole 21 without a sag thereof, and the electrical cable 24 is smoothly inserted into the second harness insertion hole 22 such that a plug connector 25 engages with a receptacle connector 36 of the auxiliary unit 5. The electrical cable 24 does not receive a larger bending stress to prevent an aging damage of the electrical cable 24 and is easy in an insertion work thereof. The auxiliary unit receiving recess 27 having the bottom extended from the base plate 6 allows a smooth mounting work of a larger auxiliary unit 5 therein.

Although the resilient member 2 and the guide lower portion 10a along the resilient member 2 are disposed between the first harness insertion hole 21 and the second harness insertion hole 22, a part of the wiring harness 3 can be arranged via a short route with no interruption with the resilient member 2 and the lower portion 10a. This eliminates a damage of the wiring harness 3 due to the interruption with the resilient member 2. This eliminates an increase in size of the protector main body 1 which would be otherwise required to make the protector main body 1 to have a larger depth or to provide another longer route for the wiring harness 3.

As illustrated by chain lines in FIG. 6, an electrical cable 42 led from the auxiliary unit 5 may be passed through the first harness insertion hole 21 to be inserted into an outer harness passage 15 (FIG. 1).

The protector main body 1 is secured on an inner panel of the sliding door by a bolt or the like which is inserted into a securing hole 32, for example of a bracket 31. The protector main body 1 is overlaid by a cover (not shown) to complete a protector as a harness protecting structure, and a protector assembly is constituted by the protector main body 1, the resilient member 2, the auxiliary unit 5, and the cover. The resilient member 2 is preferably made of a metal plate but may be configured in various shapes.

The protector assembly may be mounted not in the sliding door but in a side of the car body. In this case, the protector main body 1 is preferably disposed not in a vertical position but in a horizontal position.

In connection with FIG. 1, when the base end 2a (a fixing end of the protector main body 1) of the resilient member 2 is located in a base end side 17 of the wiring harness 3, the electrical cable 24 of the wiring harness 3 is led to the auxiliary unit 5 via a rear side of the resilient member 2. On the contrary, in the embodiment, the base end 2a of the resilient member 2 is spaced form the base end side 17 of the wiring harness 3 and is positioned generally perpendicular to the base end side 17 of the wiring harness 3. This allows the resilient member 2 to contact the wiring harness 3 with the resilient member 2 being deflected to define a curve. Thereby, the pre-deflected resilient member 2 exerts a resilient force on the wiring harness 3, surely correcting a slack of the wiring harness 3 without delay.

The circumferential wall 10 provided for protectively receiving the auxiliary unit 5 is not limited in an elongated circle shape but may define a circle wall or another circumferential wall as far as the wall can support the resilient member 2 with an appropriate curve. The harness passage 15 of the wiring harness 3 toward the sliding door may be disposed at a fore end (around the straight portion 14) of the protector main body 1, which eliminates the outer peripheral wall 8.

What is claimed is:

1. A feeder assembly of a car sliding door having a protector and a wiring harness arranged in the protector, the wiring harness led from the sliding door to a car body side characterized in that the assembly comprises a generally circumferential wall positioned inside the protector and an auxiliary unit disposed within the wall, the auxiliary unit connected to the wiring harness.

2. The feeder assembly described in claim 1, characterized in that the assembly further comprises a resilient member resiliently urging the wiring harness within the protector in a direction to prevent slack of the wiring harness, and the generally circumferential wall also serves as a stopper to limit the bending of the resilient member.

3. The feeder assembly described in claim 1, characterized in that the assembly further comprises an inside harness insertion hole and an outside harness insertion hole which are formed in the circumferential wall, the outside harness insertion hole leading the wiring harness outside the protector, the inside harness insertion hole leading the wiring harness inside the protector.

4. The feeder assembly described in claims 1, characterized in that the circumferential wall has a bottom deeper than a base pate of the protector.

5. The feeder assembly described in claim 4, characterized in that the inside harness insertion hole of the circumferential wall is disposed between the bottom of the circumferential wall and the base pate of the protector.

6. The feeder assembly described in claim 1, characterized in that the auxiliary unit is secured in the protector.

* * * * *

UNITED STATES PATENT AND TRADEMARK OFFICE
CERTIFICATE OF CORRECTION

PATENT NO. : 6,809,264 B2
DATED : October 26, 2004
INVENTOR(S) : Watanabe, Hiroshi et al.

It is certified that error appears in the above-identified patent and that said Letters Patent is hereby corrected as shown below:

<u>Title page,</u>
Item [73], Assignee, change "Yazaki Corporation, Tokyo (JP)" to -- Yazaki Corporation, Tokyo (JP), Aisin Seiki Kabushiki Kaisha, Kariya-shi (JP) --.

Signed and Sealed this

Fourth Day of April, 2006

JON W. DUDAS
*Director of the United States Patent and Trademark Office*